Oct. 11, 1938.   J. R. LEHMAN   2,133,031
BACK GAUGE FOR PAPER CUTTERS
Filed Jan. 22, 1937   2 Sheets-Sheet 1

INVENTOR.
JOHN R. LEHMAN
BY
Kwis Hudson & Kent
ATTORNEYS

Oct. 11, 1938.  J. R. LEHMAN  2,133,031
BACK GAUGE FOR PAPER CUTTERS
Filed Jan. 22, 1937  2 Sheets-Sheet 2
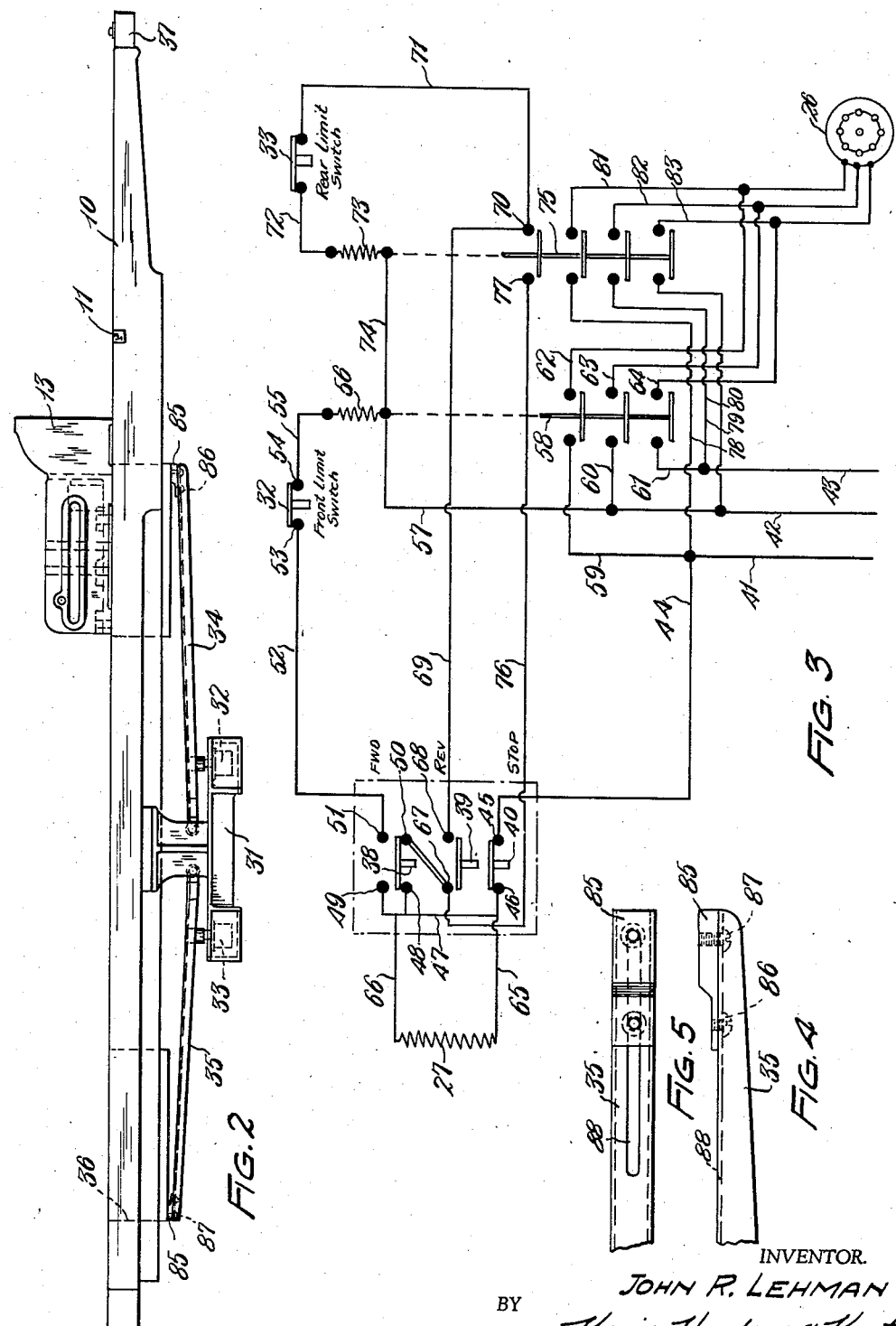
INVENTOR.
JOHN R. LEHMAN
BY
Kwis Hudson & Kent
ATTORNEYS Patented Oct. 11, 1938

2,133,031

UNITED STATES PATENT OFFICE 2,133,031

BACK GAUGE FOR PAPER CUTTERS

John R. Lehman, Dayton, Ohio, assignor to Harris-Seybold-Potter Company, Cleveland, Ohio, a corporation of Delaware Application January 22, 1937, Serial No. 121,725

5 Claims. (Cl. 164—59)

This invention relates to improvements in back gauges for paper cutters, that is to say, paper cutters in which a descending cutter blade is caused to cut through a stack or pile of sheets supported upon a table against a back gauge.

The back gauge of such a machine is ordinarily moved back and forth by a screw mounted beneath the table running through a nut carried by the back gauge. These screws are generally turned manually by the operator standing at the front of the machine. In the present case the feed screw is power-driven by a motor which is so connected electrically as to be operable instantaneously in either direction.

One of the objects of the invention is the provision of means for so operating the motor.

Another object is the provision of means for automatically applying a braking action to the feed screw immediately after current to the motor is cut off in order that the stopping of the feed mechanism may be instantaneous. This is particularly desirable when the stack of paper is being moved up to the line of cut. Under the control which I have devised the back gauge may be moved up quickly and accurately to a point just short of the line of cut, after which by manual control the movement may be continued slowly until the gauge reaches the precise point desired.

Other objects and features of novelty will appear as I proceed with the description of that embodiment of the invention which, for the purposes of the present application, I have illustrated in the accompanying drawings, in which Fig. 1 is a plan view of a paper cutter embodying the invention.

Fig. 2 is an elevational view of the same.

Fig. 3 is a wiring diagram illustrating the electrical control.

Figs. 4 and 5 are detail side elevational and plan views respectively, on a larger scale, of a limit switch arm used in connection with the invention.

Figure 1:
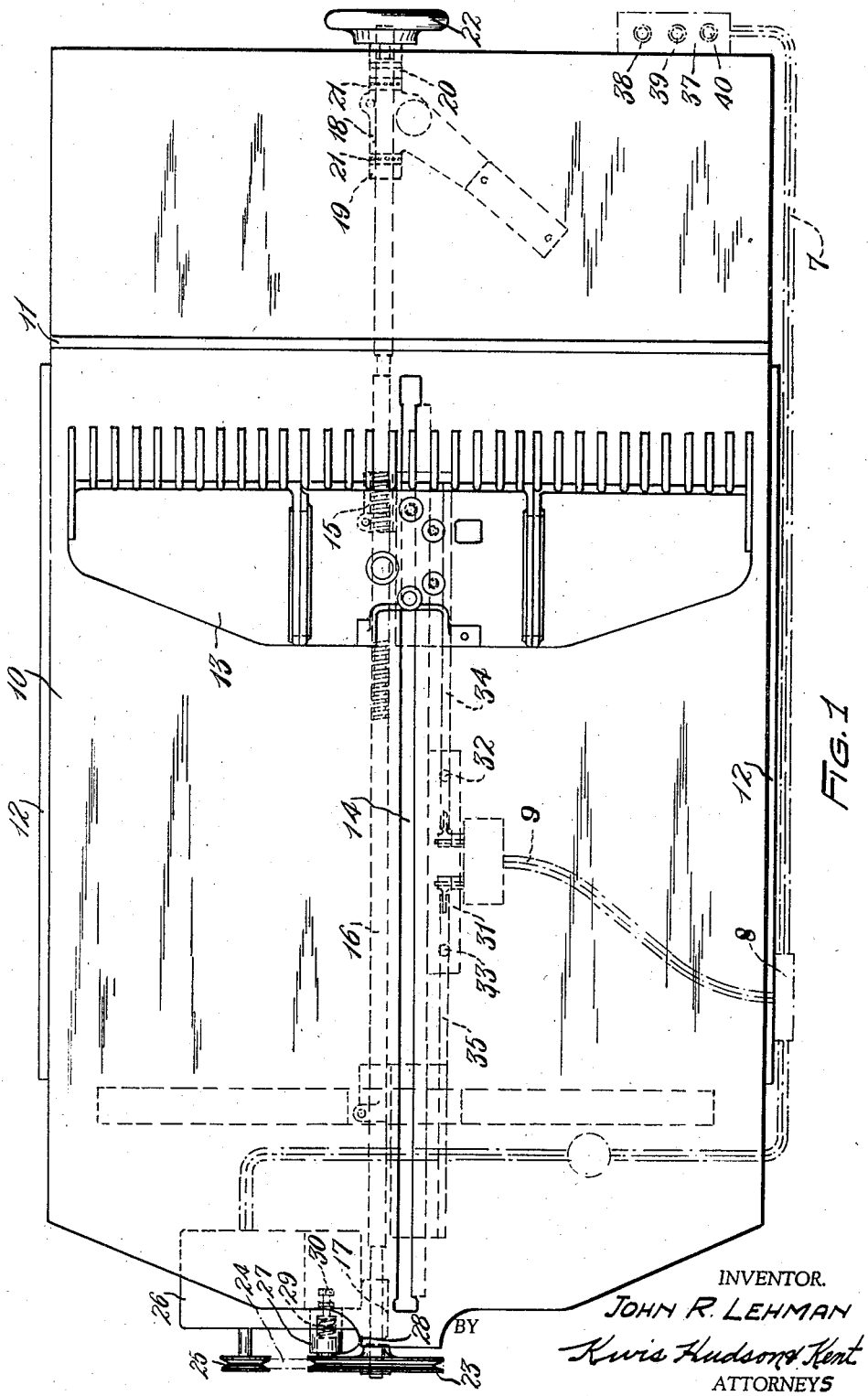

In the drawings I have shown at 10 a table upon which the paper to be cut is supported. This table is of course mounted upon a suitable base or frame, not herein illustrated. A cutting stick 11 is mounted in a transverse groove of the table, and a cutting knife (not shown) is mounted for vertical reciprocation directly over the cutting stick. A side guide 12 may be provided along one or both side edges of the table. Slidable over the surface of the table is the usual back gauge 13. A portion of the gauge extends downwardly through a longitudinal slot 14 in the table, and carries a nut 15 that runs upon a feed screw 16 of more or less conventional form. This screw is mounted in bearings 17 and 18 supported from the under side of the table. Between the bearing 18 and collars 19 and 20 fixed to the screw are anti-friction bearings 21, designed to take thrust. A hand wheel 22 mounted on the forward extremity of the screw is utilized for manual movement of the back gauge.

On the rear extremity of screw 16 there is keyed a pulley 23 over which runs a belt 24 that is driven by a small pulley 25 on the shaft of an electric motor 26 designed to run in either direction. 27 is a solenoid fixedly mounted beneath the table and having a solid iron armature 28 which is adapted to engage a side wall of pulley 23 and exert a braking effect thereon. The armature 28 is urged forwardly to operative or braking position by a coil spring 29, the tension of which may be controlled by a regulating screw 30. When solenoid 27 is energized the armature 28 is withdrawn against the action of spring 29. At all other times the brake is maintained in braking position.

About midway between the safe limits of movement of the back gauge 13 I mount upon the lower side of the table, or the frame which supports it, a bracket 31 in which are supported front and rear limit switches 32 and 33 respectively. A pair of levers 34 and 35 are so pivoted to the bracket 31 as to swing in vertical planes intersecting the buttons of switches 32 and 33. These levers are supported upon their respective switch buttons which are supplied with resilient means for holding the switches closed. The levers 34 and 35 are made of such length that when the gauge 13 reaches its predetermined limit of motion in either direction it engages and depresses the outer end of the corresponding lever, causing the switch 32 or 33, as the case may be, to be opened. In Fig. 2 the back gauge is shown in full lines at the point where it engages lever 34 and opens switch 32, while the rear limit position is indicated in dotted lines 36 at which point the lever 35 is caused to open switch 33. The limit switches and their operating mechanism are therefore arranged in one unit assembly.

The outer ends of the levers 34 and 35 carry lugs 85 which are mounted adjustably by means of screws 86 and 87 extending through a slot 88 in the horizontal portion of the lever, the latter being of inverted channel shape. By this means small variations in the limit of travel of the back gauge may be permitted.

An electric control box 37 is mounted on the front end of the table in a location convenient for the operator. In this box there are three push buttons 38, 39 and 40 from which conductors arranged in a cable 7 extend rearwardly to magnetic switches carried in a box 8, and thence to motor 26. Conductors extend also from box 8 in a cable 9 over to the limit switches 32 and 33.

The normal positions of the push buttons 38, 39 and 40 are illustrated in Fig. 3. The electric system is so arranged that when push button 38 is moved upwardly, as shown in that figure, connections are made which start the motor 26 in the proper direction to move the back gauge forward, and these connections continue only so long as the operator keeps his hand on the "forward" button. On the other hand when motion of the back gauge in the reverse direction is desired, the operator merely touches reverse button 39, whereupon connections are set up to operate motor 26 in the opposite direction, and these connections are maintained automatically until the back gauge reaches its rearward limit of motion, or until the operator pushes stop button 40.

Reference numerals 41, 42 and 43 indicate line wires. From line wire 41 a conductor 44 leads to a contact 45 of switch 40. From the other contact 46 of that switch a conductor 47 leads to the two contacts 48 and 49 of switch 38. This switch has two other contacts 50 and 51. When the "forward" button 38 is pushed in an electric connection is made from conductor 47 through contacts 49 and 51 to a conductor 52 which leads to a contact 53 of limit switch 32. The other contact 54 of that switch is connected by a conductor 55 with one end of an electromagnet 56, from the other end of which a conductor 57 extends to line wire 42. A circuit is thereby set up through electromagnet 56 which raises magnet switch 58. While the magnet switch 58 is thus in the up position, circuits are set up through conductors 59, 60 and 61 from line wires 41, 42 and 43 across magnet switch 58 to conductors 62, 63 and 64 and to motor 26 for imparting rotation thereto in a given direction. As soon as the operator releases push button 38, or as soon as limit switch 32 is opened by the actuation of lever 34, the circuit through coil 56 is broken, magnet switch 58 falls and the current to motor 26 is interrupted. During the time that motor 26 is thus in operation current also passes through coil 27 by way of conductors 65 and 66 through contact 49, push button 38, contact 51, conductor 52, limit switch 32, conductor 55, coil 56 and conductor 57 back to line wire 42. The brake armature 28 is thereby held away from engagement with pulley 23.

When the desired cuts on a stack of sheets are completed and the operator wishes to move the back gauge rearwardly preparatory to beginning another series of cuts, he pushes reverse button 39 whereupon current passes from line wire 41 through conductor 44, across switch 40, through conductor 47 to contact 48, across switch 38 to contact 50 and to a contact 67 permanently connected therewith, then across switch 39 to a contact 68, through a conductor 69 to a contact 70 through a conductor 71 to rear limit switch 33, from that switch through a conductor 72 to a magnet coil 73, and through a conductor 74 and conductor 57 to line wire 42. The energization of coil 73 raises a magnet switch 75. This switch completes a holding circuit from contact 67 of the reversing button through a conductor 76 to a contact 77 of the magnet switch, across that switch to contact 70, through conductor 71, limit switch 33, conductor 72, coil 73, and conductors 74 and 57 back to line wire 42. Thereupon, the operator may release push button 39 without breaking the circuit through coil 73. Brake-retracting coil 27 is also energized in the same manner as before. Now that magnet switch 75 is in the up position, connections are made from line wires 41, 42 and 43 through conductors 78, 79 and 80, magnet switch 75, and conductors 81, 82 and 83 to the motor, but it will be noted that the arrangement of conductors 79 and 80 is the reverse of the arrangement of conductors 60 and 61. The direction of rotation of motor 26 is therefore the reverse of that in the first instance and the mechanism operates to move the back gauge rearwardly instead of forwardly. This motion will continue uninterrupted until rear limit switch 33 is opened by the operation of lever 35, unless in the meantime the operator pushes in stop button 40. Either of these things will serve to break the circuit through coil 73, permitting magnet switch 75 to drop, and thereby interrupting the current to the motor and to the brake-retracting coil 27.

The operation of the machine and its control by the operator have been sufficiently stated in connection with the foregoing description of its construction and of the electrical apparatus employed for actuating it. The machine is capable of operation without the expenditure of any considerable amount of physical effort, and it will be apparent that by employing the power mechanism for rapidly moving the gauge until a desired setting is approximately reached and then completing the movement by hand manipulation of wheel 22, cuts may be made in rapid sequence without any sacrifice of accuracy.

While in the foregoing description and in the accompanying drawings I have described and illustrated more or less in detail one specific embodiment of the invention, I desire it to be understood that such detailed disclosure is resorted to primarily for the purpose of complying with the requirements of the statute, and that the invention is to be limited only by the claims hereunto appended.

Having thus described my invention, I claim:

1. In a paper cutting machine, a table, a back gauge movable thereover forwardly and backwardly, an electric motor arranged to drive said back gauge in either direction, front and rear limit switches for opening the circuit of said motor when the gauge reaches predetermined forward or rearward positions, a fixed bracket arranged intermediate the limits of travel of the back gauge, and lever means carried by the bracket adapted to be actuated by the gauge when it reaches its predetermind limits of movement, said lever means being adapted to operate said switches.

2. In a paper cutting machine, a table, a back gauge movable thereover forwardly and backwardly, an electric motor arranged to drive said back gauge in either direction, a fixed bracket arranged at an intermediate point in the length of the table, front and rear limit switches mounted on said bracket for interrupting the supply of current to said motor when the gauge reaches a predetermined forward or rearward position, and lever means adapted to be actuated by the gauge when it reaches its predetermined limits of movement, said lever means being adapted when actuated by the gauge to operate one of said switches.

3. In a paper cutting machine, a table, a back gauge movable thereover forwardly and backwardly, an electric motor arranged to drive said back gauge in either direction, front and rear limit switches for opening the circuit of said motor when the gauge reaches predetermined forward or rearward positions, a bracket for supporting said switches at a point between the forward and rearward limits of travel of the back gauge, and lever means carried by the bracket and adapted to be actuated by the gauge when it reaches its predetermined limits of movement for operating said limit switches.

4. In a paper cutting machine, a table, a back gauge movable thereover forwardly and backwardly, an electric motor arranged to drive said back gauge in either direction, front and rear limit switches for opening the circuit of said motor when the gauge reaches predetermined forward or rearward positions, a fixed bracket arranged intermediate the limits of travel of the back gauge, a pair of levers pivotally mounted on said bracket, one extending forward and the other extending rearward, each of said levers being adapted to be swung on its pivot when the back gauge reaches one of its predetermined limit positions, said levers when swung on their pivotes by the back gauge being adapted to open the corresponding limit switches.

5. In a paper cutting machine, a table, a back gauge movable thereover forwardly and backwardly, an electric motor arranged to drive said back gauge in either direction, front and rear limit switches for opening the circuit of said motor when the gauge reaches predetermined forward or rearward positions, a bracket for supporting said switches at a point between the forward and rearward limits of travel of the back gauge, a pair of levers pivotally mounted on said bracket between said limit switches, one lever extending forwardly and the other rearwardly from the bracket, each of said levers being adapted to be swung on its pivot by the back gauge as the latter reaches a limit of movement in one direction and being adapted during such swinging movement to engage and open one of said limit switches.

JOHN R. LEHMAN.